3,185,640
REFORMING REACTION IN WHICH THE REACTION IS CONTROLLED BY ULTRAVIOLET ANALYSIS OF THE REFORMATE
David K. Beavon, Lockport, Ill., assignor to Texaco Inc., New York, N.Y., a corporation of Delaware
Filed Oct. 11, 1961, Ser. No. 145,534
5 Claims. (Cl. 208—134)

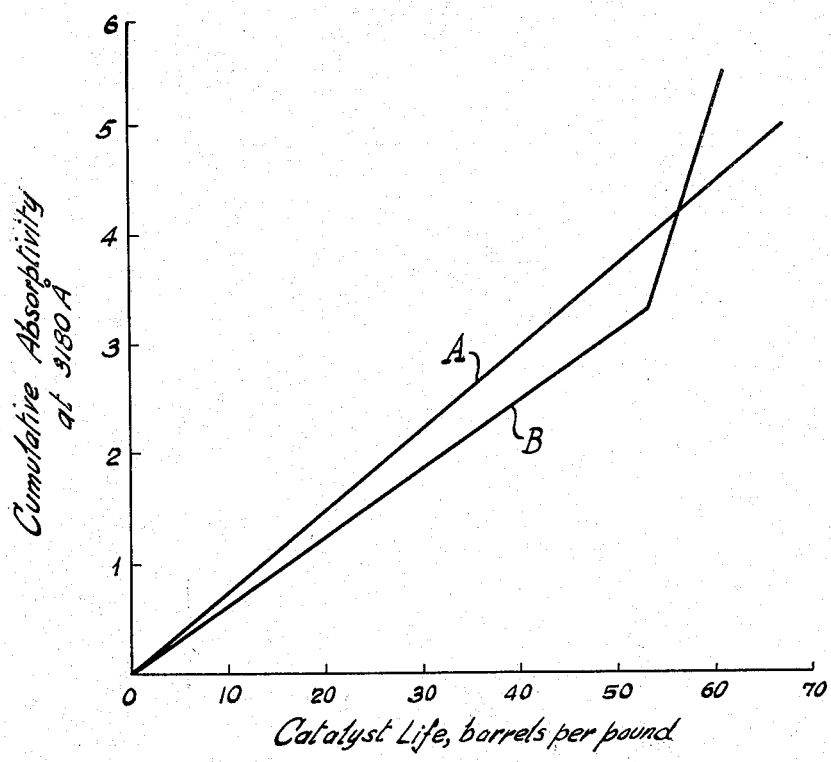

This application is a continuation-in-part of my copending application Serial No. 773,021, filed November 10, 1958, now abandoned.

This invention relates to the catalytic treatment of hydrocarbons, and, more particularly to the catalytic reforming of petroleum naphtha. In a more specific aspect, the invention relates to a method for controlling a process variable in a reforming operation and further for predicting the life of the catalyst employed in the operation.

During catalytic processing with solid particulate catalysts, the reactants are passed through a bed of porous catalyst particles, beads or pellets. In many such reactions employing organic materials at elevated temperatures, a carbonaceous deposit accumulates on the catalyst surface and in the pores and openings of the catalyst as the process proceeeds under continuous operating conditions. This deposition of carbonaceous material results in a decrease in catalyst activity and loss in selectivity, and is a function of the reactants, the reaction product, the conditions of the process and the catalyst. In many instances, the deactivated catalyst may be regenerated, generally by combustion to restore the activity of the catalyst. The catalyst may require frequent regeneration, or it may be alternately on stream and on regeneration for substantially equal periods of time. Other catalysts may be on stream for long periods of time, e.g. four or five months, before regeneration is necessary. Regardless, regeneration of the catalyst material is economically undesirable in that it is not only exceedingly costly, but equally important entails a period of non-productivity.

However, not all catalysts are regenerable. Thus, with certain catalysts the activity is seriously impaired by the deposition of carbonaceous matter thereon, or the activity of the catalyst is not satisfactorily restored by the removal of the carbonaceous deposit. With still other catalysts, the activity is destroyed by the heat of combustion resulting upon regeneration. For example, certain platinum type catalysts containing 0.1 to 5% by weight platinum on an alumina support, which may be treated with a halide to promote catalyst activity, and used in the catalytic reforming of petroleum naphtha, are exceedingly difficult to regenerate, and, in fact, have often been found to be substantially non-regenerable. Although numerous attempts have been made to regenerate the platinum type reforming catalyst, and several methods have been disclosed, none of these methods have been completely satisfactory. Consequently, when a substantially non-regenerable catalyst has become inactivated during processing, the operation must be discontinued, the catalyst removed from the reactor and the system replenished with fresh catalyst. This procedure is quite obviously time-consuming and expensive.

In order to reduce or control the carbonaceous deposit on reforming catalyst, attempts have been made to standardize the operating conditions such as temperature, pressure, space velocity or rate of hydrogen recycle, or to control the point of the feed stock. However, this has not proven satisfactory because the activity of the catalyst is not predictable. That is, conditions suitable for one batch of catalyst are not necessarily suitable for another batch of the same catalyst. For example, some batches of fresh platinum-alumina catalyst at specific reaction conditions using a particular feed stock will yield a debutanized liquid product having an ASTM Research Octane Number clear of 87, whereas a difference batch of the same type platinum-alumina catalyst at identical reaction conditions, will produce a debutanized liquid product having an ASTM Research Octane Number clear of 92 from the same feed stock. Similarly, there are variations in the carbonaceous forming tendencies of different batches of the same catalyst. Experience has shown that when two batches of platinum-alumina-combined halogen catalysts having identical analyses are used for the treatment of the same feed stock under essentially identical conditions, one batch of catalyst will become deactivated because of carbonaceous deposition in a shorter period of time than the other. This inability to predict the activity of platinum-alumina reforming catalysts has presented perplexing problems to the petroleum refining industry.

In the catalytic reforming of petroleum naphtha, gasolines and gasoline stocks with high octane ratings are obtained primarily by reason of conversion of paraffinic and naphthenic hydrocarbons to monocyclic aromatic compounds, e.g. benzene, toluene, ethylbenzene, xylene, and other alkyl derivatives of benzene. During reforming, it is believed that the carbonaceous deposit is produced from polycyclic aromatics resulting from cracking, dehydrogenation and polymerization of feed components and intermediate reaction products. That is, the polycyclic aromatic compounds such as naphthalene and anthracene produced in the operation are further condensed to non-volatile carbonaceous materials or coke. In any event, it appears that the rate of deposition of carbonaceous material on a catalyst can be somewhat checked or regulated by controlling the amount of polycyclic aromatic compounds formed in the process. Furthermore, I have found that there is a direct correlation between the amount of polycylic aromatics produced and the life of the catalyst. Formation of carbonaceous material is dependent to a large extent upon the operating conditions, the more severe the conditions, the greater tendency to form carbon. On the other hand, the operating conditions must be maintained at a sufficient level to effect economic conversion to monocyclic aromatics achieving high-octane products. Therefore, it is desirable that the process conditions are closely controlled and/or adjusted throughout the operation to obtain economic yields having suitable octane ratings for the longest possible time while operating under conditions not too severe as to accelerate the formation of polycyclic aromatics which adversely affects the activity of the catalyst. However, by conventional procedures involving sampling, running at determination for octane number and reporting of results, a long interval of time usually elapses between taking the initial sample and obtaining and reporting the results. Also, the product octane number does not define the rate of carbonaceous formation. As a consequence, any abnormal reaction condition might exist for some time before being detected. Abnormal operating conditions may result in demethanization (commonly referred to as demethylation) whereby the feed is converted to methane. Demethanization is highly exothermic and usually uncontrollable, and results in considerable damage to equipment often to the point of causing severe rupturing.

It therefore is an object of this invention to provide a method for determining desirable and economic operating conditions for use in a catalytic process for the conversion of a hydrocarbon wherein polycyclic aromatic compounds are produced as a by-product of the process.

It is another object of the invention to provide a method for controlling and/or adjusting operating conditions for a catalytic reforming process for obtaining a product of maximum yield characterized by an octane rating suitable for use in gasolines and gasoline stocks while operating under conditions which will not substantially accelerate the formation of polycyclic aromatic compounds as an undesirable by-product thereby materially affecting the activity of the catalyst.

It is still another object to provide a method of the above type whereby the operating conditions may be controlled and/or adjusted to control the rate of carbonaceous formation on the catalyst.

Still another object is to provide in a method for the catalytic treatment of the conversion of a hydrocarbon a rapid and economical means for analyzing the normally liquid product of the process and controlling and/or adjusting the process conditions in response to the analysis.

It is yet another object to provide a method for predicting the life of the catalyst for use in a hydrocarbon conversion process.

In accordance with the present invention, the normally liquid product from the catalytic treatment of hydrocarbons is alternately monitored or tested for monocyclic aromatic compounds and polycyclic aromatic compounds by passing a beam of ultraviolet radiation through the liquid. Depending on the wave length of radiation employed, the monocyclic aromatics and polycyclic aromatics absorb the ultraviolet rays. Thus, the amount of ultraviolet absorbance at a selected wave length indicates the amount present of the selected constituent under question in the liquid product. From this determination, the operating conditions can be closely controlled and/or adjusted, and further the life of the catalyst can be predicted, as explained below in greater detail.

The process of the invention is applicable to any catalytic hydrocarbon conversion process wherein polycyclic aromatics are produced as a by-product of the reaction, and it is particularly useful in the catalytic reforming of petroleum naphthas for the production of high octane motor fuels and aromatic compounds. Catalysts normally employed in naphtha reforming operations consist of a metal, such as platinum, or a metal oxide, such as molybdenum oxide, in combination with an acidic oxide such as silica-alumina or alumina. Such catalysts include, for example, platinum-alumina catalyst containing about 0.1 to 5% by weight platinum, and more preferably 0.3 to 0.75% platinum; molybdena-alumina catalyst containing about 10% by weight molybdenum oxide; and chromia-alumina catalyst containing about 32% by weight chromium oxide. The catalytic reforming operation may be conducted as a fixed bed, moving bed or fluidized bed operation.

The invention will now be described with particular reference to the catalytic reforming of a petroleum naphtha using a platinum-alumina reforming catalyst. Reforming of naphtha is generally conducted at temperatures between about 850 to 1050° F., pressures of 100–1000 p.s.i.g., space velocities of about 1 to 5 volumes of feed per volume of catalyst per hour (v./v./hr.) and hydrogen recycle rates of 4000 to 8000 standard cubic feet (S.C.F.) per barrel of feed. The preferred operating conditions are about 900 to 1000° F., 500 to 800 p.s.i.g., 2 to 3 volumes of feed per hour per volume of catalyst and a hydrogen rate of 7000 S.C.F. per barrel of feed. Feed stocks are normally in the boiling range of about 175 to 400° F., the end points ordinarily ranging from about 300–395° F. It will be observed that each of the conditions is a process variable which can be regulated to control the severity of the operation and the characteristics of the product. For example, if relatively low temperatures are used, too little aromatization of naphthenes and paraffins occurs to permit production of high octane gasolines, whereas if the temperature is too high, hydrocracking of the heavy paraffins will be excessive causing more rapid deactivation of the catalyst. The tendency toward hydrocracking and carbon formation is reduced by the presence of hydrogen, but it does not eliminate completely either of these adverse conditions. Operating at relatively low pressures favors aromatization while high pressures increase hydrocracking. Higher space velocities tend to decrease hydrocracking. Thus, the operating conditions must be balanced and suitably adjusted to obtain economic yields of a product having a desirable octane rating while minimizing formation of carbonaceous deposits on the catalyst which reduces or shortens the life of the catalyst.

The total effluent from the reforming operation is treated to remove hydrogen and light gaseous hydrocarbons. The resulting effluent is debutanized to obtain a liquid portion or product which generally is fractionated to separate the heavy reformate boiling in the range of 200 to 400° F. from the light reformate and from the bottoms or residues. In the heavy reformate, the aromatic content comprises mainly the alkyl derivatives of benzene, e.g., toluene, ethylbenzene, xylene, isopropylbenzene, tetramethylbenzene, etc. A beam of ultraviolet radiation is passed through the liquid product which may be scanned over a region of 2100 to 2400 Angstrom units and over a region of 3000 to 3800 Angstrom units. It has been vertified that absorption of ultraviolet radiation by the liquid product in the first region is a function of the monocyclic aromatics content, and in the second region a function of the polycyclic aromatics content. Consequently, these regions can be used to monitor a liquid product stream alternately for monocyclic aromatics and for polycyclic aromatics. Monitoring in these regions is particularly advantageous in that there is no interference from each of the other class of aromatics. The ultraviolet absorption values for the liquid product are preferably determined at a definite wave length. For example, a sample of the liquid product may be monitored at 2150 A. in measuring for monocyclic aromatics, and subsequently monitored at 3180 A. in measuring the polycyclic aromatics. The liquid product, per se, may be monitored for ultraviolet absorption, or, more desirably, the liquid product may be diluted with a solvent which has substantially no tendency to absorb light of the chosen wave length, e.g. isooctane, and the diluted product tested for ultraviolet absorption. Diluting the liquid product with a suitable solvent is advantageous in that it provides for a more accurate reading. A conventional cell varying in length from 1 millimeter to 1 centimeter may be used for containing the sample and reference.

Ultraviolet absorption may be measured as transmittancy which is defined as the ratio of the overall transmittance through a cell containing the sample, which preferably has been diluted, to the overall transmittance through a cell containing a reference, e.g. solvent only. This is more conveniently expressed as absorbance which is $$\log_{10} \frac{1}{\text{Transmittancy}}$$

The absorbance or transmittancy may be determined under different conditions, and it therefore is preferred to report absorption as absorptivity which is defined as $$\frac{\text{absorbance}}{C \times L}$$

where C is the concentration in grams of sample per liter of solution and L is cell length in centimeters. Absorptivity is more useful in expressing absorption as it permits direct comparison of absorption data obtained with solutions of different concentrations and with cells of different lengths.

For purpose of the present invention, ultraviolet absorption may be measured continuously or determined periodically, for example hourly or daily. The ultraviolet absorption may be determined by any of the several instruments now commercially available. For example, a satisfactory instrument is a Beckman Model DU Spectrophotometer made by the National Technical Laboratories, South Pasadena, California, and described in their Bulletin 91E.

In one embodiment of the invention, the normally liquid portion or product of the reaction effluent is analyzed by ultraviolet absorption means for monocyclic aromatic compounds and for polycyclic aromatic compounds, and the process conditions are controlled and/or adjusted in response to the absorptivity. That is, a sample of liquid product is analyzed by passing a beam of ultraviolet radiation through the sample at a wave length suitable for monitoring for monocyclic aromatic compounds and alternately at a wave length suitable for monitoring for polycyclic aromatic compounds. As explained above, ultraviolet radiation at the selected wave length is absorbed by the constituent under analysis, the absorptivity thus being dependent upon the contents of the sample being monitored. The octane rating of the liquid product depends upon the quantity of monocyclic aromatics present, and the operating conditions are adjusted to operate under conditions sufficiently severe to obtain optimum yields having the desired octane rating. When the liquid product is monitored for monocyclic aromatics, the absorptivity for the liquid product is maintained at or above a predetermined lever thereby indicating that the product has the desired octane rating. On the other hand, operating conditions should not be so severe as to increase inordinately the rate of carbon formation thereby deleteriously affecting the activity of the catalyst and shortening the catalyst life. Thus, in monitoring for polycyclic aromatics, the absorptivity is maintained at or below a predetermined lever thereby indicating that the amount of polycyclic aromatics formed in the process is not inordinate or excessive. Accordingly, the liquid product is analyzed, and the process conditions controlled and/or adjusted in response to the absorptivity to maintain the absorptivity for monocyclic aromatics at not less than a predetermined level while maintaining the absorptivity for the polycyclic aromatics at not greater than a predetermined level. In this manner, operating conditions for the process are regulated for obtaining economic conversion to monocyclic aromatics while not being too severe to cause a high or inordinate rate of carbonaceous formation. In the event the absorptivity approaches one or the other of the predetermined values, the severity of the operating conditions is adjusted. For example, if the absorptivity approaches the predetermined level in monitoring for polycyclic aromatics, the temperature can be reduced to lower the severity of the process or the space velocity, pressure of hydrogen recycle rate can be increased. Conversely, when the absorptivity for polycyclic aromatics is substantially below the predetermined level, thereby indicating that more severe operating conditions can be employed without an inordinate rate of carbon formation and concomitantly obtain higher yields of monocyclic aromatics, one or more of the operating variables can be adjusted to produce more severe operating conditions.

By way of illustration, in the catalytic reforming of a naphtha feed stock of known composition employing a platinum-alumina catalyst, the operating conditions are suitably adjusted to obtain a normally liquid product having the desired quantity of monocyclic aromatic compounds while not being too severe to increase inordinately the rate of carbon formation. The reforming operation is monitored by ultraviolet analysis in accordance with this invention whereby the monocyclic aromatics content and the polycyclic aromatics content is measured by determining the absorptivities at selected wave lengths and the operating conditions are closely controlled and/or adjusted to maintain the absorptivities at predetermined values. The liquid product or reformate generally contains about 35 to 60% by weight monocyclic aromatic compounds, but this may vary somewhat depending upon the composition of the feed and the desired yield. The average absorptivity for substantially pure monocyclic aromatic compounds typically present in the liquid product, measured at 2150 A. with a concentration of one gram of sample per liter of solvent and a cell length of one centimeter, is about 60 to 65. However, the absorptivity for benzene is relatively low, and if the liquid product contains benzene a correspondingly lower absorptivity reading is employed. However, in the preferred embodiment of this invention, the heavy reformate having a boiling range of from about 200 to 400° F. is scanned for ultraviolet analysis of monocyclic aromatics. Therefore, substantially no benzene is present in the heavy reformate to require adjusting or correcting the absorptivity to account for the presence of benzene. Thus, in monitoring for monocyclic aromatics with ultraviolet radiation at a wave length of 2150 A., where it is desired to obtain a liquid product having not less than 35% monocyclic aromatics, the absorptivity is maintained at or above 20, which is derived by multiplying the percent of total monocyclic aromatics present in the liquid product times the average absorptivity for monocyclic aromatics present in the product. As further examples, where the liquid product should contain not less than 40% monocyclic aromatics, the absorptivity measured at 2150 A. should not be less than about 24; and if the product contains not less than 50% monocyclic aromatics, the absorptivity is not less than about 30. It should be understood that although the relative proportions of monocyclic aromatics in the liquid product for a reforming operation employing the same feed will not vary considerably, some variation usually does occur. This in turn may affect the absorptivity reading for the liquid product and therefore should be taken into account when determining the desired absorptivity level. In monitoring for polycyclic aromatics in the liquid product with the same concentration and some cell length, in employing ultraviolet radiation at a wave length of 3180 A., the absorptivity is maintained below 0.06. Similarly, in monitoring for polycyclic aromatics when the wave length is 3350 A., the absorptivity is maintained below 0.03; or in using a wave length of 3400 A., absorptivity is maintained below 0.02. It is also possible to use wave lengths other than those mentioned above in which case each wave length will have a corresponding predetermined absorptivity level. In accordance with this embodiment, it is desirable to determine the absorptivity on a frequent or continuous basis.

In order to maintain the absorptivity at the desired level, the process conditions or variables, such as temperature, pressure, space velocity, hydrogen recycle rate or combinations thereof are controlled and/or adjusted. The process variables may be controlled automatically by any suitable system such as when the output from the photoelectric cell of the spectrophotometer is amplified and transmitted to a minimum current relay which actuates a control for the process variable. Various other instrumentation means will be obvious to those skilled in the art.

In another embodiment of the invention, the economic life of the catalyst can be predicted. In making a prediction, the absorptivity is determined periodically, e.g. 24 hour basis, and the absorptivities are accumulated by taking the sum of the absorptivities. That is, the absorptivity for the last period is added to the sum found for the absorptivities for preceding periods. The cumulative absorptivity is preferably determined on a 24 hour basis (daily basis), and in order to obtain an accurate absorptivity reading for the day, an average from several reading is found. The catalyst life is calculated as the ratio of barrels of feed charged per day per total pounds of catalyst multiplied by the number of days on stream. During the reforming operation, these values are plotted as X–Y co-ordinates; for example, the cumulative absorptivity is plotted as the ordinate and the catalyst life as the abscissa. The product of the cumulative absorptivity times the catalyst life is defined as the corrected cumulative absorptivity. By way of illustration, in a typical catalytic reforming operation employing a conventional platinum-alumina catalyst, it was found that in monitoring the liquid product, using ultraviolet radiation at a wave length of 3180 A., the corrected cumulative absorptivity falls in the range of 320 to 350, and the catalyst was no longer economically practicable for use. Thus, during subsequent reforming operations using the same type of catalyst, the curve plotted throughout the run may be extrapolated to the point or area on the graph where the corrected cumulative absorptivity falls in the range of 320 to 350. From this, the economic life of the catalyst may be predicted. It should be understood that the absorptivity may be determined at other wave lengths in which there will be a corresponding corrected cumulative absorptivity for predicting the catalyst life. For example, when using ultraviolet radiation at a wave length of 3350 A., the catalyst is not longer economically practicable when the corrected cumulative absorptivity falls in the range of 60 to 80; and at a wave length of 3400 A., the corrected cumulative absorptivity for the catalyst life is within the range of 50 to 65.

Predicting the life of the catalyst is manifestly advantageous. For example, a shutdown of operations for testing and inspection of equipment can be scheduled to coincide with the end of the economic life of the catalyst. Also, when the catalyst is approaching the end of its economic life and where the by-product hydrogen is employed in other operations in the plant, the severity of the catalytic reforming operation may be reduced to prolong the life of the catalyst thereby avoiding the immediate shutdown of the other hydrogen consuming operation.

The following examples will further illustrate my invention:

*Example I*

In order to illustrate the advantages of my invention, two separate reforming runs are compared. Run 1 is conducted at normal operating conditions, there being no attempt to control or adjust the operating conditions to maintain the ultraviolet absorption at a desired predetermined value. In Run 2, the operating conditions are carefully adjusted to maintain the absorptivity at a predetermined value. The catalyst in each run is a different sample from the same batch of conventional platinum-alumina reforming catalyst consisting of about 0.75% by weight platinum and 1% by weight chloride as a catalyst promotor.

In Run 1, a straight run naphtha having a boiling end point of 390° F. and comprising about 47% by weight paraffins, 41% naphthenes and 12% aromatics, is reformed at an initial temperature of about 925° F., an average pressure of 500 p.s.i.g., a space velocity of 3 v./v./hr. and a hydrogen to hydrocarbon mol ratio of 8:1. During the run, particularly at the beginning, absorptivity readings for polycyclic aromatics, determined at 3180 A., of 0.08 to 0.14 are noted. The liquid product contains 34% by weight paraffins, 8% naphthenes and 58% aromatics (comprising predominately monocyclic aromatics), and has a research octane number (A.S.T.M. D908) of 90.8 and with 3 cc. of tetraethyl lead the octane number is 98.7. During the run, the temperature is increased intermittently thereby increasing the severity of the operation in order to obtain a liquid product having the desired octane rating. The catalyst is on stream 104 days when economical yields are no longer obtainable, thereby indicating that the catalyst is no longer practicable for use, and the operation is discontinued. The catalyst life is 37 barrels of feed per pound of catalyst.

In comparative Run 2, a straight run naphtha similar to the one used in Run 1 comprising about 48% by weight paraffins, 40% naphthenes, and 12% aromatics, is reformed at an initial temperature of 900° F., an average pressure of 500 p.s.i.g., a space velocity of 3 v./v./hr. and a hydrogen recycle rate in the mol ratio of 8 mols of hydrogen per mol of hydrocarbon. The temperature is gradually increased to 950° F. while monitoring a sample for polycyclic aromatics to maintain the ultraviolet absorptivity below the level of 0.06 as determined at a wave length of 3180 A. Normal operating conditions are reached after about 2½ barrels of feed per pound of catalyst have been introduced into the reactor. A sample of the liquid product substantially similar to that obtained in Run 1 is monitored for monocyclic aromatics at a wave length of 2150 A., and the absorptivity is maintained at not less than about 30. The operation is then continued under conditions controlled to maintain the absorptivities at the desired values. After 189 days of operation, the conversion became uneconomical, the catalyst life being 67 barrels of feed per pound of catalyst.

*Example II*

This example shows the correlation between the life of the catalyst and the corrected cumulative absorptivity whereby the life of the catalyst can be predicted. In this example, Run 2 from the preceding example is used as the base run. The cumulative absorptivity measured at a wave length of 3180 A. is plotted daily against the catalyst life in barrels of feed per pound of catalyst as curve A in the accompanying diagram. Upon plotting the curve until the catalyst is spent whereby economic yields are no longer attainable, it is found that the economical practicable use or life of the catalyst has expired when the corrected cumulative absorptivity is about 335, which lies in the range of 320 to 350.

Run 3, using a different batch the same type of catalyst as above, is operated under essentially the same conditions as Run 2. The cumulative absorptivity of Run 3 determined at a wave length of 3180 A. is plotted against the catalyst life in barrels of feed per pound of catalyst as curve B in the accompanying diagram. The readings determined during the run are plotted daily, and the lower cumulative absorptivities in the earlier stages of the run indicate, upon extrapolation of the curve, a longer life expectancy for the catalyst of Run 3 than that shown for the catalyst of Run 2. However, a deleterious effect on catalyst life at 53 barrels per pound is shown by the increase in the absorptivity at that point by reason of a gas contactor upset. By conventional known methods, there would be no way of knowing how much damage would be sustained by the catalyst by an operating upset of this type. However, upon further extrapolation of the curve to the point where the corrected cumulative absorptivity falls within the predetermined range of 320 to 350, it is found that the time on stream for the catalyst is about 170 to 175 days indicating a catalyst life of about 60 to 65 barrels per pound.

Having described my invention and certain embodiments thereof, I claim:

1. In a catalytic reforming process wherein a hydrocarbon naphtha fraction is passed at an elevated temperature and pressure through an effective reforming catalyst under reforming conditions in which condensed polycyclic aromatic compounds are formed as a by-product and in which said catalyst gradually becomes deactivated, the improvement which comprises analyzing the normally liquid portion of the reaction product by passing ultraviolet radiation through said liquid portion at a wave length of 3000 to 3800 A., determining the absorptivity for said liquid portion, discontinuing said reforming when the corrected cumulative absorptivity lies within a predetermined range and resuming the reforming process by passing the hydrocarbon naphtha feed in contact with a reforming catalyst of higher activity than the deactivated catalyst.

2. A process according to claim 1 wherein said reforming catalyst is a platinum-alumina catalyst and in which the ultraviolet radiation is at a wave length of 3180 A.

and the corrected cumulative absorptivity is within the range of 320 to 350.

3. In a process for the catalytic conversion of a hydrocarbon naphtha fraction in which at least a portion of the hydrocarbon feed is converted to monocyclic aromatic compounds, in which condensed polycyclic aromatic compounds are formed as a by-product and in which the catalyst gradually becomes deactivated, the improvement with comprises analyzing the normally liquid portion of the reaction product by passing a first beam of ultraviolet radiation through said liquid portion at a wave length ranging from 2100 to 2400 A. and passing a second beam of ultraviolet radiation through said liquid portion at a wave length ranging from 3000 to 3800 A., determining the absorptivity for said liquid portion for said first and said second beam, controlling the operating conditions for said process in response to said absorptivity readings to maintain the first absorptivity at not less than a predetermined level while maintaining the second determined absorptivity at no more than a predetermined level, whereby said conversion process is operated under conditions to attain conversion of a portion of said hydrocarbon fraction to monocyclic aromatic compounds while controlling the rate of carbonaceous formation on said catalyst, determining the corrected cumulative absorptivity from said second absorptivity reading, discontinuing said treatment when said corrected cumulative absorptivity lies within a predetermined range, and resuming said conversion by contacting said hydrocarbon naphtha fraction with a catalyst of higher activity than the deactivated catalyst.

4. A process according to claim 3 wherein the liquid portion analyzed by ultraviolet radiation at said wave length of 2100 to 2400 A. comprises the heavy reformate having a boiling range of from about 200 to 400° F.

5. A process according to claim 3, wherein said catalyst is a platinum-alumina catalyst, in which the wave length for said first beam of ultraviolet radiation is 2150 A. and said first determined absorptivity is not less than 20 and in which the wave length for said second beam of ultraviolet radiation is 3180 A. and said second determined absorptivity is not more than 0.06.

References Cited by the Examiner
UNITED STATES PATENTS

| | | | |
|---|---|---|---|
| 2,664,386 | 12/53 | Haensel | 208—66 |
| 2,790,016 | 4/57 | Lanneau | 260—674 |
| 2,977,289 | 3/61 | Kron | 196—132 |
| 3,000,812 | 9/61 | Boyd | 196—132 |
| 3,023,254 | 2/62 | Othmer et al. | 208—134 |

ALPHONSO D. SULLIVAN, *Primary Examiner.*